(12) United States Patent
Russi et al.

(10) Patent No.: US 8,068,598 B1
(45) Date of Patent: Nov. 29, 2011

(54) AUTOMATIC AGENT TRAINING SYSTEM

(75) Inventors: Dario Russi, Austin, TX (US); Qian Chen, Fremont, CA (US)

(73) Assignee: LiveOps, Inc., Santa Clara, CA (US)

( * ) Notice: Subject to any disclaimer, the term of this patent is extended or adjusted under 35 U.S.C. 154(b) by 843 days.

(21) Appl. No.: 12/080,289

(22) Filed: Apr. 2, 2008

(51) Int. Cl.
*H04M 5/00* (2006.01)
(52) U.S. Cl. .................. 379/265.07; 379/265.06
(58) Field of Classification Search ............ 379/265.07, 379/265.03, 265.06, 265.02
See application file for complete search history.

(56) References Cited

U.S. PATENT DOCUMENTS

| | | | | |
|---|---|---|---|---|
| 6,600,821 B1 * | 7/2003 | Chan et al. | ............... | 379/265.07 |
| 2006/0233347 A1 * | 10/2006 | Tong et al. | ............... | 379/265.06 |
| 2008/0260122 A1 * | 10/2008 | Conway et al. | ........... | 379/112.01 |
| 2010/0115149 A1 * | 5/2010 | Ewer | ............................. | 710/19 |

* cited by examiner

*Primary Examiner* — Creighton Smith
(74) *Attorney, Agent, or Firm* — PatentEsque Law Group, LLP

(57) ABSTRACT

An exemplary method for training call center agents over a communications network using automatically selected training scenarios comprises the steps of obtaining confirmations of availability of a plurality of call center agents, determining a proctor based on proctor attributes stored in a database, selecting an agent from the plurality of agents, based on agent attributes stored in the database, to be trained by the proctor, automatically determining a training scenario based on the selected agent's attributes, and enabling the proctor and the agent to engage in the training scenario.

27 Claims, 4 Drawing Sheets

AUTOMATIC AGENT TRAINING SYSTEM

BACKGROUND

Call center agents, whether in a brick and mortar call center or working remotely, need training to become competent at handling all types of calls. Agents-in-training may read documents, watch videos, listen to audio instructions, and/or learn via other traditional learning systems. Some call centers may manually stage mock production calls during training. However, these mock calls are generally pre-determined and may not specifically address the training needs of individual agents.

Thus, it would be beneficial to provide a method and system to automatically customize training scenarios for individual agents.

SUMMARY

An exemplary method for training call center agents over a communications network using automatically selected training scenarios comprises the steps of obtaining confirmations of availability of a plurality of call center agents, determining a proctor based on proctor attributes stored in a database, selecting an agent from the plurality of agents, based on agent attributes stored in the database, to be trained by the proctor, automatically determining a training scenario based on the selected agent's attributes, and enabling the proctor and the agent to engage in the training scenario.

Other exemplary embodiments and implementations are disclosed herein.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

I. Overview

Section II describes an exemplary system for training call center agents using automatically selected training scenarios.

Section III describes exemplary processes for training call center agents using automatically selected training scenarios.

Section IV describes an exemplary computing environment.

Figure 1:
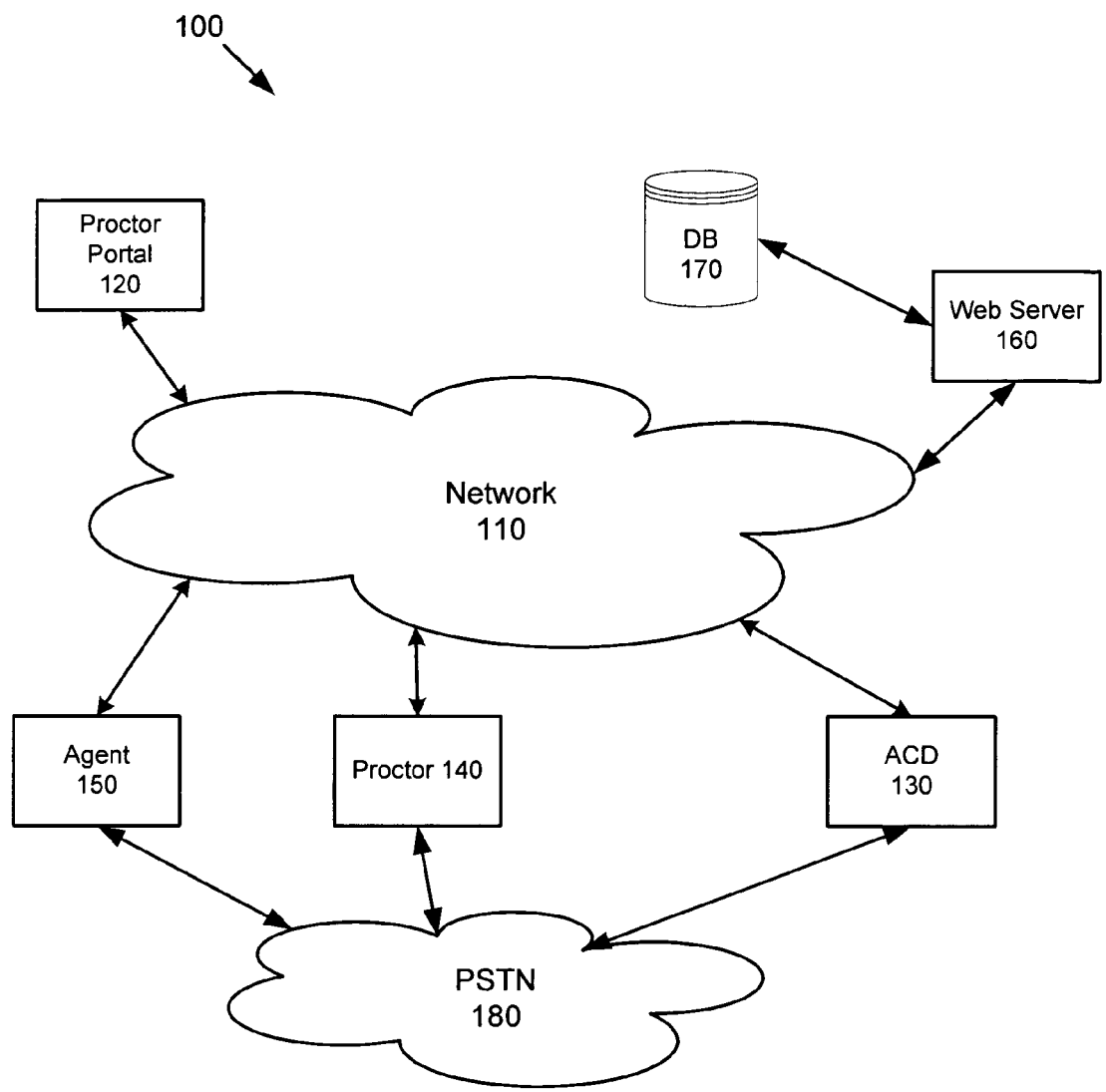
FIG. 1 illustrates an exemplary system for automatically determining training scenarios and facilitating the training process.

II. An Exemplary System for Training Call Center Agents Using Automatically Selected Training Scenarios FIG. 1 illustrates an exemplary system 100 for training call center agents using automatically selected training scenarios. The system 100 includes a proctor portal 120, an automatic call director (ACD) 130, a proctor 140, an agent 150, a web server 160, and a database 170. In an exemplary implementation, these components are connected to each other via a communications network 110, such as the Internet. For ease of explanation purposes, multiple components are not illustrated. For example, the agent 150 may represent a plurality of agents, the proctor 140 may represent a plurality of proctors, the web server 160 may represent multiple servers, and so forth. One skilled in the art will recognize that these and other components may be readily added to the network 110.

In an exemplary implementation, the system 100 also includes the PSTN 180 which may be directed by the ACD 130 to connect a proctor 140 to an agent 150 in a telephone training call.

Figure 2:
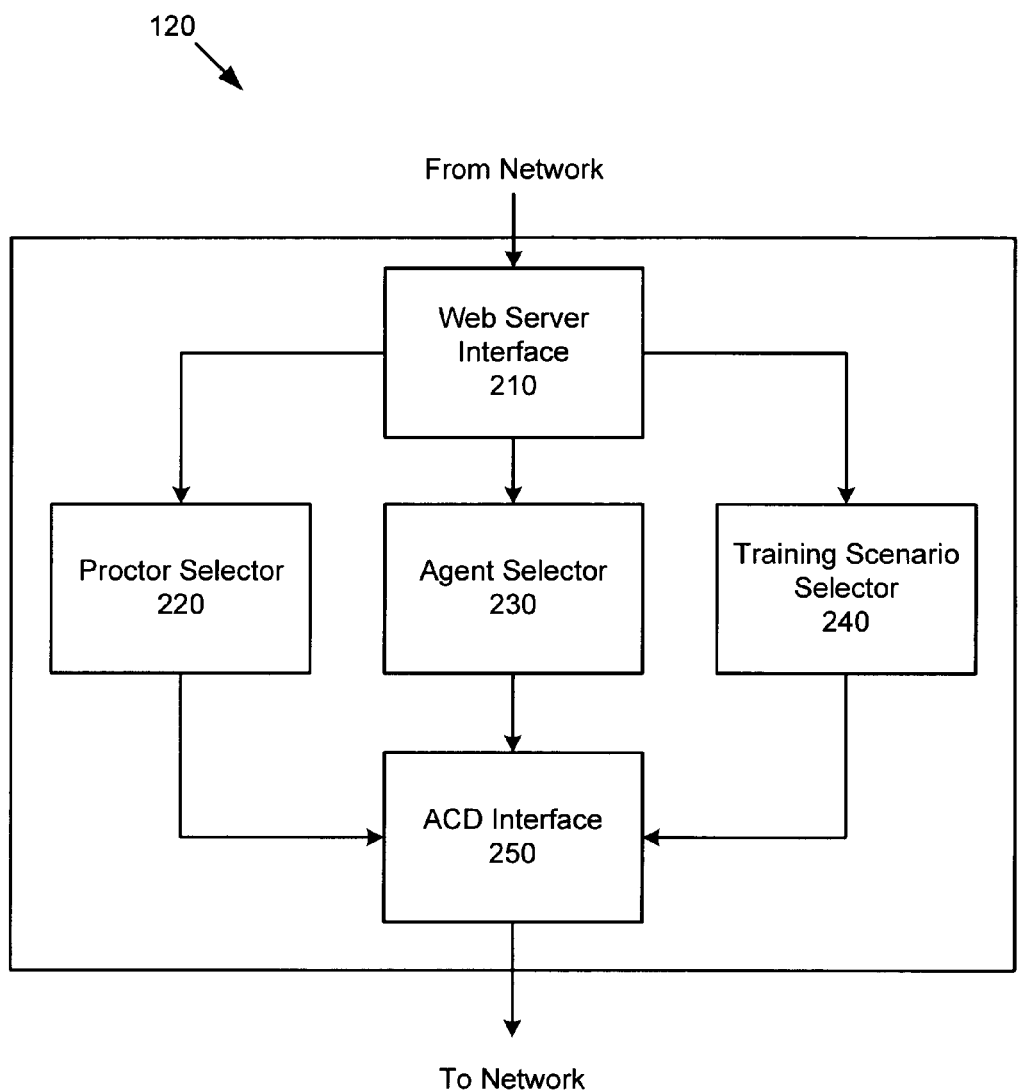
FIG. 2 illustrates an exemplary proctor portal of FIG. 1.

The proctor portal 120 facilitates training between a proctor 140 and an agent and automatically determines a training scenario based on the respective attributes of each pair of proctor 140 and agent 150. In an exemplary implementation, the proctor portal 120 instructs the ACD 130 to connect a selected proctor 140 to a selected agent 150 for facilitating a specific training scenario. Calls may be connected via voice over IP (VoIP) or the PSTN 180, or a combination of both. An exemplary proctor portal 120 is illustrated in FIG. 2 and will be described in more detail below.

The ACD 130 generally functions to direct calls to different resources within the call center (e.g., an interactive voice response system, an agent, etc.). In an exemplary implementation, the ACD 130 may be implemented as a scriptable call director that is configured to invoke executable software scripts for handling different types of calls (e.g., for different campaigns, programs within campaigns, and/or other types). Different software scripts may cause different computer screens to be displayed to guide agents through calls.

The proctor 140 may be a certified proctor or may be an experienced agent who is qualified to train other agents, or even automated (e.g., as an interactive voice response or IVR unit). Proctor attributes include, without limitation, experience with handling different types of calls, experience with training agents, past call handling performance, past training performance, language abilities, geographic locations, revenue generated or conversion rate, ratings among trained agents, duration of being idle during a period of available time, and/or other attributes. The proctor 140 is typically equipped with a telephone system connected to the PSTN 180 and a computing system able to communicate with the ACD 130 via the network 110. In an exemplary implementation, where the proctor 140 conducts calls via the VoIP, the proctor 140 need not have a telephone system connected to the PSTN 180. During a training call, different computer screens may be presented to the proctor 140 to guide the proctor 140 through the training session.

The agent 150 may be a new agent or an experienced agent who requires additional training for different reasons (e.g., training in new areas, training to become a certified proctor, etc.). Agent attributes include, without limitation, experience with handling different types of calls, past call handling performance, past training sessions, language abilities, geographic locations, revenue generated, target campaigns or pools for the agent, duration of being idle during a period of available time, and/or other attributes. The agent 150 is typically equipped with a telephone system connected to the PSTN 180 and a computing system able to communicate with the ACD 130 via the network 110. In an exemplary implementation, where the agent 150 conducts calls via the VoIP, the agent 150 need not have a telephone system connected to the PSTN 180. During a training call, different computer screens may be presented to the agent 150 to guide the agent 150 through the training session.

The web server 160 may be a part of the proctor portal 120 or may be an independent server. The web server 160 is configured to receive sign-in information from available agents and proctors, access attribute information stored in the database 170, and provide availability and attribute information to the proctor portal 120. In an exemplary implementation, training results are provided to the web server 160 from the proctor portal 120 to be stored in the database 170. The training results can be used to modify the proctor's 140 and/or the agent's 150 attributes stored in the database 170.

FIG. 2 illustrates an exemplary proctor portal 120. The proctor portal 120 includes a web server interface 210, a proctor selector 220, an agent selector 230, a training scenario selector 240, and an ACD interface 250.

The web server interface 210 facilitates communications between the proctor portal and the web server 160 for obtaining proctor and agent availability and attribute information.

The proctor selector 220 obtains available proctor and proctor attribute information from the web server 160 thorough the web server interface 210. Based on the proctor attribute information, the proctor selector 220 selects a proctor among all available proctors to handle a specific training scenario to be determined by the training scenario selection 240. In an exemplary implementation, if multiple proctors 140 are qualified for a specific training scenario (i.e., have committed to a given time block and have certain attribute set required for the training scenario), then the proctor who has been idle for the longest period of time is selected to be the proctor.

Proctors may be selected from among available agents. In this implementation, the proctor selector 220 may also obtain agent availability and attribute information from the web server 160 through the web server interface 210. Proctors may alternatively be an IVR unit. In this implementation, the proctor selector 220 selects the most suitable IVR for handling a specific training scenario determined by the training scenario selector 240.

The agent selector 230 obtains available agent and agent attribute information from the web server 160 thorough the web server interface 210. Based on the agent attribute information, the agent selector 230 selects an agent among all available agents to receive training based on a specific training scenario to be determined by the training scenario selection 240. In an exemplary implementation, if multiple agents 150 require training based on a specific training scenario (i.e., have committed to a given time block and have certain attribute set triggering the training scenario), then the agent who has been idle for the longest period of time is selected to be trained.

An agent to be trained may happen to be a proctor for other training scenarios. For example, some proctors may require training in a new area to become qualified to handle calls or become proctors in that area. In this implementation, the agent selector 230 may also obtain proctor availability and attribute information from the web server 160 through the web server interface 210.

In general, new agents will become trained for at least the initial campaigns or programs for which the agent takes calls. For example, all new agents may be required to take a number of training calls before being certified to take calls for a particular customer and become part of a pool of certified agents.

Agents who have been taking calls already may need re-training or re-certification for new campaigns or for honing specific skills based on past performance. An auditor listening to calls may flag an agent as "needing improvement." When a given agent reaches a threshold of need-improvement flags, that agent may be automatically scheduled for training calls.

In an exemplary implementation, the agent selector 230 is configured to automatically scan agents based on predefined metrics, which may include, without limitation, call length, conversion rate, revenue generated or conversion rate, number of dropped transfers, number of misplaced orders, number of inaccurate customer information entries, a combination of some or all these and/or other metrics.

The training scenario selector 240 obtains agent and proctor attribute information from the web server 160 thorough the web server interface 210. Based on the agent and proctor attribute information, the training scenario selector 240 automatically determines a training scenario for any given pair of agent and proctor. The training scenario may be selected from a set of predefined scenarios or may be dynamically generated by the training scenario selector 240. For example, a new software script may be created based on other existing software scripts. Attributes considered by the training scenario selector 240 include, without limitation, agent metrics used for agent selection, proctor metrics used for proctor selection, types of flags attached to an agent, experience of an agent, experience of a proctor, past performance, and/or other attributes.

The selected pair of proctor and agent and a determined specific training scenario are provided to the ACD 130 via the ACD interface 250. In an exemplary implementation, the ACD is instructed to connect the selected proctor and agent and to invoke a software script associated with the specific training scenario to facilitate the training call session between the proctor and the agent.

Figure 3:
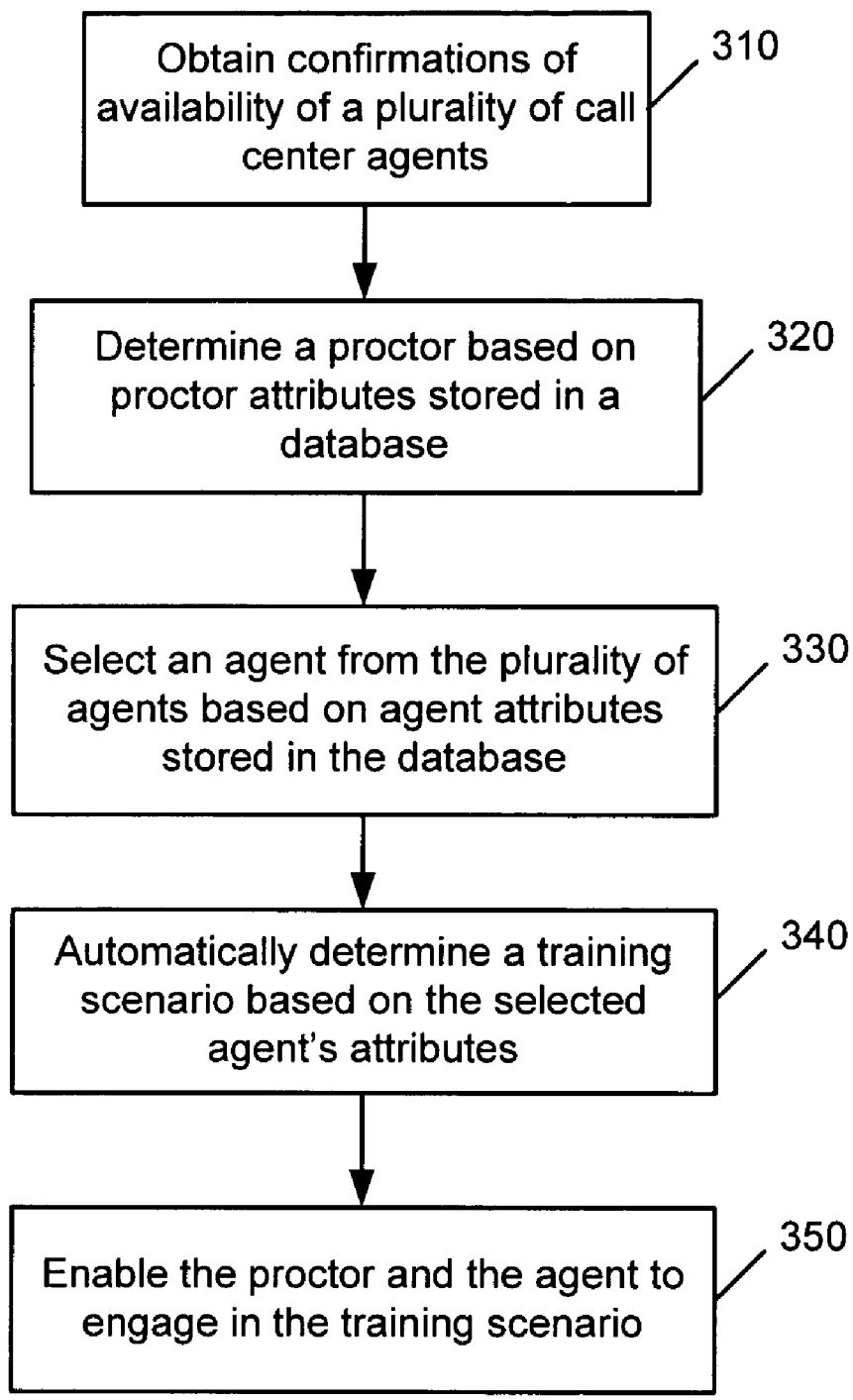
FIG. 3 illustrates an exemplary process for training call center agents using automatically selected training scenarios.

III. Exemplary Processes for Training Call Center Agents Using Automatically Selected Training Scenarios FIG. 3 illustrates an exemplary process for training call center agents using automatically selected training scenarios.

At step 310, a proctor portal 120 obtains confirmations of availability of a plurality of call center agents. In an exemplary implementation, the proctor portal 120 obtains the information from a web server 160.

At step 320, the proctor portal 120 determines a proctor based on proctor attributes stored in a database. In an exemplary implementation, the proctor portal 120 obtains proctor availability and proctor attribute information from the web server 160. The proctor attribute information is stored in a database, such as the database 170. In another exemplary implementation, the proctor portal may have direct access to a database (e.g., a local database or a remote database via a communications network 110).

At step 330, the proctor portal 120 selects an agent from the plurality of agents based on agent attributes stored in the database. In an exemplary implementation, the proctor portal 120 obtains agent attribute information from the web server 160. The agent attribute information is stored in a database, such as the database 170. In another exemplary implementation, the proctor portal may have direct access to the database.

At step 340, the proctor portal 120 automatically determines a training scenario based on the selected agent's attributes. In an exemplary implementation, the proctor portal 120 automatically selects one of a set of predefined training scenarios based on various metrics related to the agents.

At step 350, the proctor portal 120 enables the proctor and the agent to engage in the training scenario. In an exemplary implementation, the proctor portal 120 instructs the ACD 130 to connect the selected agent and proctor in a telephone call and to facilitate the specific training scenario.

Figure 4:
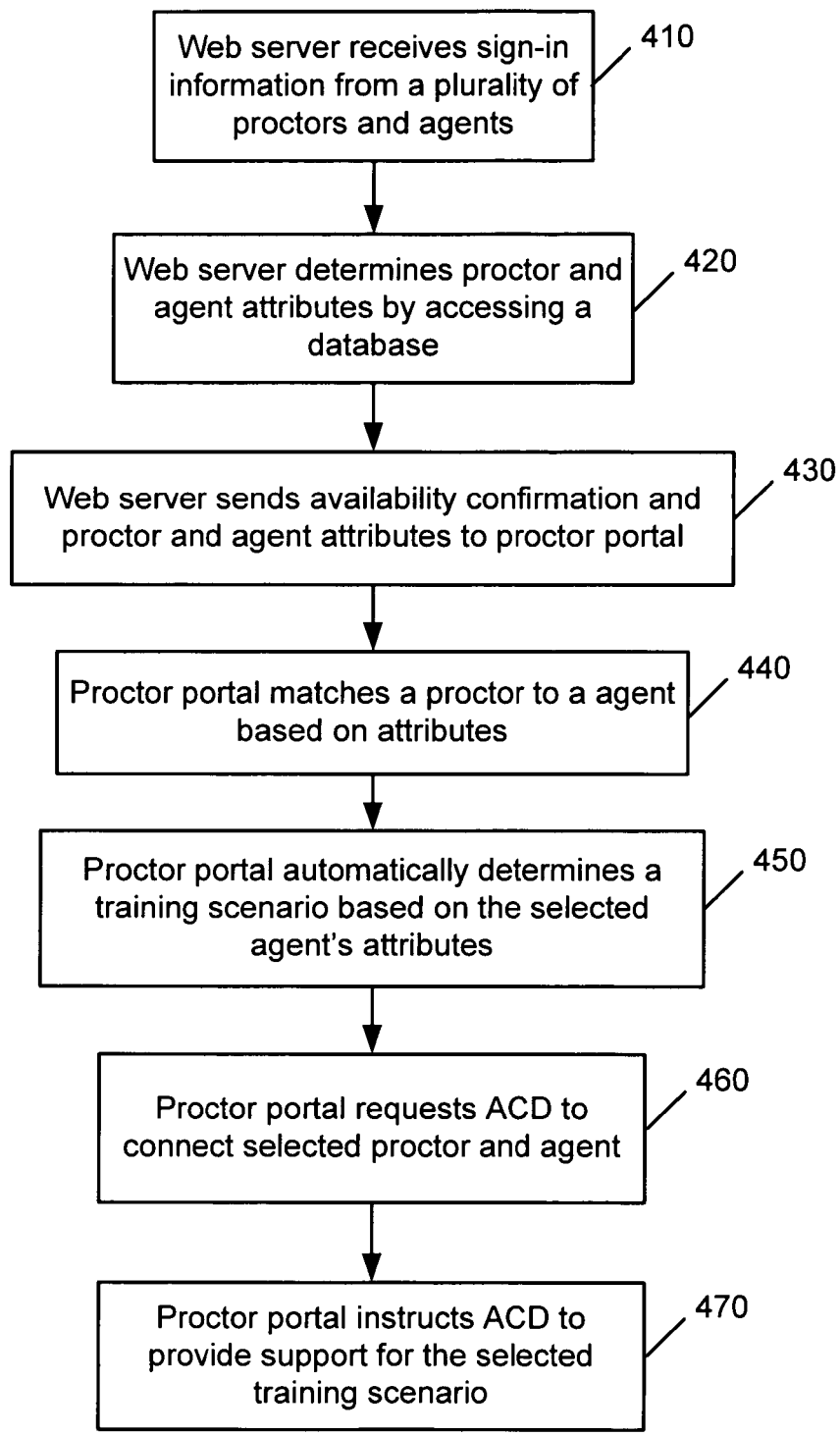
FIG. 4 illustrates an exemplary process for training call center agents using automatically selected training scenarios in accordance with one exemplary implementation.

FIG. 4 illustrates an exemplary process for training call center agents in accordance with a specific implementation.

At step 410, the web server 160 receives sign-in information from a plurality of proctors and agents. During sign-in, each proctor and agent commits to a block of time for handling calls, performing training, or receiving training. An IVR as a proctor will generally not be required to "sign-in."

At step 420, the web server 160 obtains proctor and agent attributes by accessing the database 170. In an exemplary implementation, the web server 160 obtains only the information related to the individuals who have signed-in.

At step 430, the web server 160 sends availability confirmations and relevant proctor and agent attributes to the proctor portal 120.

At step 440, the proctor portal 120 matches a proctor to an agent based on their respective attributes.

At step 450, the proctor portal 120 automatically determines a training scenario based on the selected agent's attributes, the selected proctor's attributes, a combination thereof, or other factors.

At step 460, the proctor portal 120 requests the ACD to connect the selected proctor and agent in a telephone call. In an exemplary implementation, the ACD connects the proctor and agent in a telephone call via the PSTN 180. In another implementation, the ACD connects the proctor and agent in a VoIP call via the communications network 110.

At step 470, the proctor portal 120 instructs the ACD to provide support for the selected training scenario. In an exemplary implementation, an associated software script is invoked and appropriate computer screens are displayed to both the proctor and the agent to facilitate the training session.

In general, training results may be monitored and acquired by the proctor portal 120. In an exemplary implementation, the proctor portal 120 sends any training results to the web server 160 to be used to modify the attributes of the proctor, the agent, or both. Any attribute modifications and training results may be stored in the database 170.

IV. Exemplary Operating Environments

The techniques described herein can be implemented using any suitable computing environment. The computing environment could take the form of software-based logic instructions stored in one or more computer-readable memories and executed using a computer processor. Alternatively, some or all of the techniques could be implemented in hardware, perhaps even eliminating the need for a separate processor, if the hardware modules contain the requisite processor functionality. The hardware modules could comprise PLAs, PALs, ASICs, and still other devices for implementing logic instructions known to those skilled in the art or hereafter developed.

In general, then, the computing environment with which the techniques can be implemented should be understood to include any circuitry, program, code, routine, object, component, data structure, and so forth, that implements the specified functionality, whether in hardware, software, or a combination thereof. The software and/or hardware would typically reside on or constitute some type of computer-readable media which can store data and logic instructions that are accessible by the computer or the processing logic. Such media might include, without limitation, hard disks, floppy disks, magnetic cassettes, flash memory cards, digital video disks, removable cartridges, random access memories (RAMs), read only memories (ROMs), and/or still other electronic, magnetic and/or optical media known to those skilled in the art or hereafter developed.

V. Conclusion

The foregoing examples illustrate certain exemplary embodiments from which other embodiments, variations, and modifications will be apparent to those skilled in the art. The inventions should therefore not be limited to the particular embodiments discussed above, but rather are defined by the claims. Furthermore, some of the claims may include alphanumeric identifiers to distinguish the elements and/or recite elements in a particular sequence. Such identifiers or sequence are merely provided for convenience in reading, and should not necessarily be construed as requiring or implying a particular order of steps, or a particular sequential relationship among the claim elements.

What is claimed is:

1. A method for training call center agents over a communications network using automatically selected training scenarios, comprising:
    (a) obtaining confirmations of availability of a plurality of call center agents;
    (b) determining a proctor based on proctor attributes stored in a database;
    (c) selecting an agent from the plurality of agents, based on agent attributes stored in the database, to be trained by the proctor;
    (d) automatically determining a training scenario based on the selected agent's attributes; and
    (e) enabling the proctor and the agent to engage in the training scenario.

2. The method of claim 1, wherein said proctor is selected based on said proctor's past performance.

3. The method of claim 1, wherein said proctor is selected from said plurality of call center agents.

4. The method of claim 1, wherein said proctor is an interactive voice response unit.

5. The method of claim 1, wherein said agent attributes include past call handling performance.

6. The method of claim 1, wherein metrics for selecting an agent based on agent attributes are customizable.

7. The method of claim 1, wherein said automatically determining includes dynamically generating a new training scenario.

8. The method of claim 1, wherein said automatically determining includes dynamically selecting a pre-defined training scenario.

9. The method of claim 1, wherein said enabling includes instructing an automatic call director to send appropriate software scripts to the proctor and the agent.

10. A system for training call center agents over a communications network using automatically selected training scenarios, comprising:
    a web server interface configured to obtain confirmations of availability of a plurality of call center agents;
    a proctor selector configured to determine a proctor based on proctor attributes stored in a database;
    an agent selector configured to select an agent from the plurality of agents, based on agent attributes stored in the database, to be trained by the proctor;

a training scenario selector configured to automatically determine a training scenario based on the selected agent's attributes; and a automatic call director interface configured to enable the proctor and the agent to engage in the training scenario.

11. The system of claim 10, wherein said proctor is selected based on said proctor's past performance.

12. The system of claim 10, wherein said proctor is selected from said plurality of call center agents.

13. The system of claim 10, wherein said proctor is an interactive voice response unit.

14. The system of claim 10, wherein said agent attributes include past call handling performance.

15. The system of claim 10, wherein metrics for selecting an agent based on agent attributes are customizable.

16. The system of claim 10, wherein said training scenario selector is further configured to dynamically generate a new training scenario.

17. The system of claim 10, wherein said training scenario selector is further configured to dynamically select a predefined training scenario.

18. The system of claim 10, wherein said automatic call director interface is further configured to instruct an automatic call director to send appropriate software scripts to the proctor and the agent.

19. A non-transitory computer-readable medium for training call center agents over a communications network using automatically selected training scenarios, comprising logic instructions that, if executed:

(a) obtain confirmations of availability of a plurality of call center agents;

(b) determine a proctor based on proctor attributes stored in a database;

(c) select an agent from the plurality of agents, based on agent attributes stored in the database, to be trained by the proctor;

(d) automatically determine a training scenario based on the selected agent's attributes; and (e) enable the proctor and the agent to engage in the training scenario.

20. The computer-readable medium of claim 19, wherein said proctor is selected based on said proctor's past performance.

21. The computer-readable medium of claim 19, wherein said proctor is selected from said plurality of call center agents.

22. The computer-readable medium of claim 19, wherein said proctor is an interactive voice response unit.

23. The computer-readable medium of claim 19, wherein said agent attributes include past call handling performance.

24. The computer-readable medium of claim 19, wherein metrics for selecting an agent based on agent attributes are customizable.

25. The computer-readable medium of claim 19, wherein said logic instructions for automatically determine include logic instructions that, if executed, dynamically generate a new training scenario.

26. The computer-readable medium of claim 19, wherein said logic instructions for automatically determining include logic instructions that, if executed, dynamically select a predefined training scenario.

27. The computer-readable medium of claim 19, wherein said logic instructions for enable includes logic instructions that, if executed, instruct an automatic call director to send appropriate software scripts to the proctor and the agent.

* * * * *